United States Patent [19]

Klein

[11] 4,281,439
[45] Aug. 4, 1981

[54] SELF-CLEATING ROPE HOLDER

[76] Inventor: Keith W. Klein, 18 Walker Dr., Simsbury, Conn. 06070

[21] Appl. No.: 67,098

[22] Filed: Aug. 16, 1979

Related U.S. Application Data

[62] Division of Ser. No. 911,374, Jun. 1, 1978, Pat. No. 4,178,661.

[51] Int. Cl.³ .............................................. F16G 11/00
[52] U.S. Cl. ...................................................... 24/130
[58] Field of Search .................. 24/130, 18, 264, 81 F

[56] References Cited

U.S. PATENT DOCUMENTS

| 904,747 | 11/1908 | Anderson | 24/130 |
| 1,059,630 | 4/1913 | Poetzch | 24/130 |
| 2,296,082 | 9/1942 | Bierk | 24/130 |
| 4,026,229 | 5/1977 | Winberg | 24/130 |

Primary Examiner—Roy D. Frazier
Assistant Examiner—Alexander Grosz

[57] ABSTRACT

A rope holder includes a body having anchoring means facilitating attachment to a member. The free end of a rope leading from an object to be tied down, is threaded through a first aperture and then a second aperture, both formed in the body. Also formed in body is a V-shaped notch having its wide end in open communication with the second aperture. The rope is pulled tight through the two apertures and then moved laterally out of the second aperture into the slot, where it is wedged to maintain the desired rope tightness.

1 Claim, 11 Drawing Figures

SELF-CLEATING ROPE HOLDER

REFERENCE TO RELATED APPLICATION

This application is a division of my co-pending application, Ser. No. 911,374, filed June 1, 1978, now U.S. Pat. No. 4,178,661.

BACKGROUND OF THE INVENTION

The present invention relates generally to rope holders and more particularly to an improved rope holder for adjustably belaying and conveniently releasing the free end of a rope. It is common practice in prior art rope holders to provide V-shaped slots or kerfs in which the rope is wedged to maintain a desired rope tightness. Exemplary of such prior art are the following U.S. Pat. Nos.: 760,428; 868,765; 1,480,006; 1,670,257; 2,316,950; 2,640,240; 2,642,640; 3,575,371; 3,931,821 and 3,953,911. Apart from their relative complexities of design and lacking in convenience to use, a common disadvantage of these prior art devices is the total lack of control over the rope while it is removed from the belaying slot. Consequently, it is somewhat difficult, once the rope is pulled to a desired tightness, to conveniently manipulate the rope back into the slot so as to maintain the desired rope tightness.

It is accordingly an object of the present invention to provide an improved rope holder for conveniently and rapidly belaying the free end of a rope or the like in secure and reliable fashion.

A further object of the present invention is to provide a rope holder of the above character which is inexpensive to manufacture.

Other objects of the invention will in part be obvious and in part appear hereinafter.

SUMMARY OF THE INVENTION

In accordance with the present invention, there is provided a rope holder for, in effect, tying off or belaying a line or rope in a secure and reliable manner. The rope holder is uniquely constructed to accommodate the belaying of a rope quickly and simply by an operator with a routine manipulation of the rope free end which can be accomplished while his attention is elsewhere.

More specifically, the rope holder of the present invention includes a body in which is incorporated adjacent one end anchoring means facilitating attachment of the holder to a convenient member. Also provided in the body adjacent its other end are first and second apertures. A rope leading from an object to be tied down is threaded freely through the first aperture and then the second aperture. A V-shaped slot or kerf is also formed in the holder body with its wide end in open communication with the second aperture. The slot extends from its wide end generally in a direction toward the first aperture to its narrow or apex end. The free end of the rope extending beyond the second aperture is pulled generally in a reflexive direction relative to the rope extension beyond the first aperture in achieving a desired tension and then is drawn laterally to move the portion of the rope in the second aperture into the V-shaped slot where it becomes wedged to maintain the desired tightness. To release the rope, the free end of the rope is simply manipulated to draw the rope back out of the V-shaped slot and into the second aperture where it is free to run relative to the holder.

The invention accordingly comprises the features of construction, combinations of elements, and arrangements of parts which will be exemplified in the constructions hereinafter set forth, and the scope of the invention will be indicated in the claims.

For a fuller understanding of the nature and objects of the invention, reference should be had to the following detailed description taken in connection with the accompanying drawings in which.

DETAILED DESCRIPTION

Figure 1:
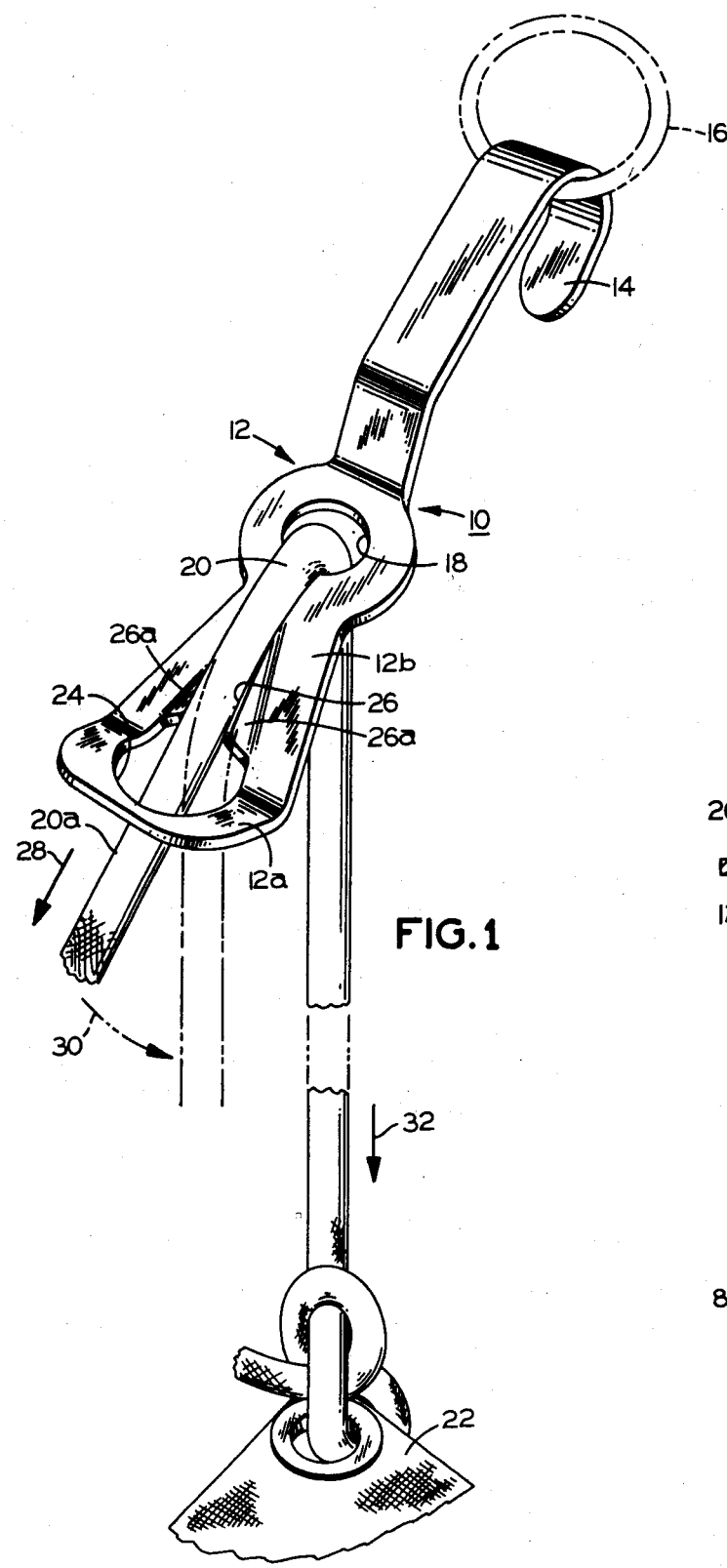
FIG. 1 is a perspective view of a rope holder constructed in accordance with one embodiment of the present invention.
Figure 2:
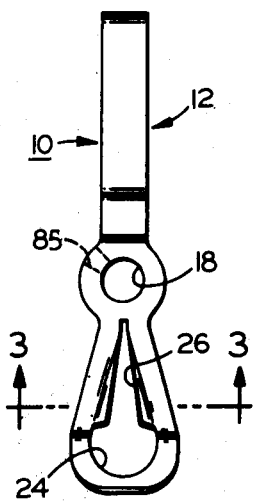
FIG. 2 is a plan view of the rope holder of FIG. 1.
Figure 3:
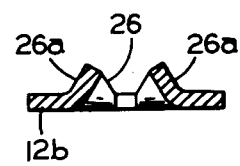
FIG. 3 is a sectional view taken along line 3—3 of FIG. 2.

Referring now to the drawings, a rope holder, generally indicated at 10 and constructed in accordance with the embodiment of the present invention seen in FIGS. 1 through 3, includes an elongated body 12 which may be formed from metal or plastic sheet stock. The upper end portion of body 12 is turned back on itself to provide convenient anchoring means in the form of a hook 14 shown caught on a stationary ring 16. Formed in an intermediate portion of body 12 is a first aperture 18 through which freely passes a rope 20 leading from an object 22, such as a sail or tarpaulin, to be tied down. Adjacent the end of body 12 opposite from hook 14, there is formed a second aperture 24 through which the free end portion 20a of rope 20 from aperture 18 freely passes. The terminal portion 12a of body 12 bounding the side of aperture 24 remote from aperture 18 is bent out of the plane occupied by the body portion 12b intermediate the two apertures. Formed in this intermediate body portion 12b is a V-shaped slot 26 having its wide end in open communication with aperture 24. As illustrated, slot 26 extends toward aperture 18 to a narrow, apex end adjacent thereto. Preferably, the portions of body 12 defining the sides of slot 26 are bent up out of the plane of intermediate body portion 12b in the same direction as is bent up body portion 12a, as indicated at 26a.

To use rope holder 10, the free end 20a of rope 20 is simply grasped and pulled generally in the direction indicated by arrow 28 to apply the desired tension to object 22. It will be observed that by virtue of bent up body portion 12a, the rope can be readily elevated out of slot 26, thus permitting essentially free running of the rope through the two apertures of the holder. Once the desired tension has been achieved, the free end 20a of the rope is swung or drawn downwardly generally in the direction of arrow 30 to move the portion of the rope in aperture 24 out into V-shaped slot 26 where it becomes wedged to maintain the desired tension on object 22. It will be noted that this tension, acting in the direction of arrow 32 will inherently pull the rope deeper in to slot 26, thereby securely belaying the rope. To release the rope, the free end 20a is grasped and drawn from its belayed, phantom line position to its solid line position where a slight pull in the direction of arrow 28 will cause the rope to ride out of slot 26 and into aperture 24 where it is again free to run freely through the holder apertures in relaxing the tension on object 22. Also to be noted is the fact that the bent-up body portion 12a serves to controllably confine the free end of the rope within aperture 24 all the while it is removed from slot 26, thereby always maintaining the rope in a position from which it can be conveniently moved into the slot by the operator. In other words, the position of the rope with respect to the slot 26 is effectively controlled while it is being drawn tight, and thus there can be no difficulty encountered in manipulating the rope into the belaying slot when the desired tension has been achieved.

Figure 4:
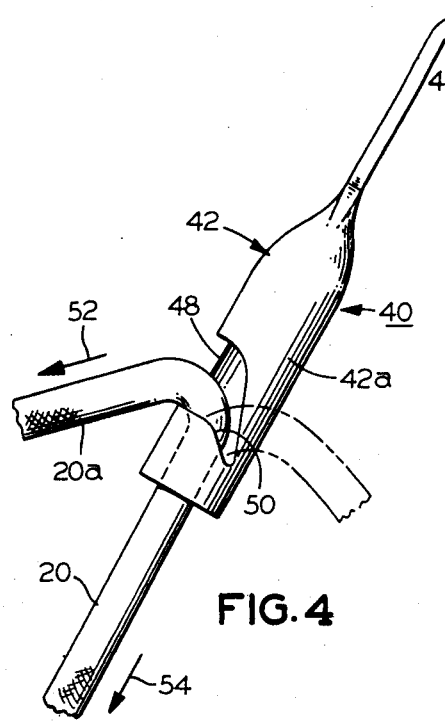
FIG. 4 is a side view of a rope holder constructed in accordance with an alternative embodiment of the present invention.
Figure 5:
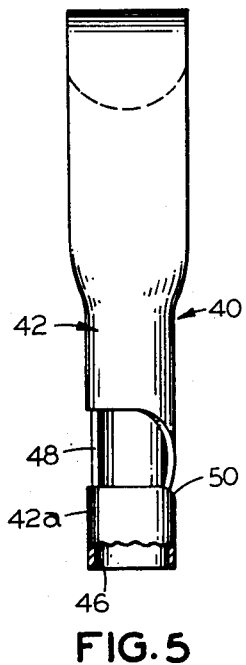
FIG. 5 is a plan view of the rope holder of FIG. 4.

The principal features of the present invention seen in FIGS. 1-3 may be embodied in a rope holder generally indicated at 40 and constructed in the manner illustrated in FIGS. 4 and 5. In this embodiment, the body, generally indicated at 42, is formed from metal or plastic stock. The upper end portion is flattened out with its terminal portion turned back on itself to provide a hook 44. The lower tubular portion 42a of body 42 terminates in an open end constituting an aperture 46, equivalent to aperture 18 in rope holder 10 of FIG. 1. Formed in the side wall of tubular body portion 42 is a second aperture 48, equivalent to aperture 24 of rope holder 10. Rope 20 leading from the object to be tied down (not shown) is led through aperture 46 and then through aperture 48 from which the rope free end 20a extends. Adjacent one side of aperture 48 there is provided a V-shaped kerf or slot 50 with its wide end in open communication with aperture 48. This slot extends downwardly in the sidewall of tubular body portion 42a toward aperture 46 to its narrow, apex end.

In the utilization of rope holder 40, the free end 20a of the rope is pulled generally in the direction of arrow 52 and the rope runs freely through the two apertures 46, 48. When the desired tension has been achieved, the rope free end is shifted laterally to its phantom line position, where the rope tension, acting in the direction of arrow 54 draws the rope downwardly out of aperture 48 into V-shaped slot 50. The rope thus becomes wedged in this belaying slot to preserve the desired rope tension on the tied down object. To release the rope, the free end 20a is simply jerked laterally from its phantom line position to its solid line position where the rope can run freely through the two apertures in relaxing the tension on the object.

Figure 6:
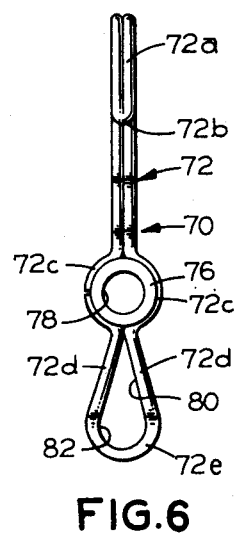
FIG. 6 is a plan view of a rope holder constructed in accordance with still another embodiment of the present invention.
Figure 7:
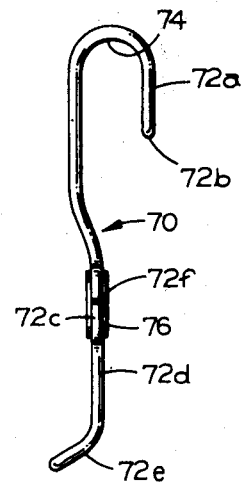
FIG. 7 is a side view of the rope holder of FIG. 6.

In the embodiment of the invention seen in FIGS. 6 and 7, a rope holder, generally indicated at 70, is fashioned with a body 72 formed of wire stock. The upper end portion 72a of this body is constituted by a pair of coextensive wire segments folded back on each other at a turn around bend 72b. The terminus of this body portion 72a is formed into a hook 74 as in the previous embodiments. The intermediate portion of body 72 is provided with opposed outwardly bowed sections 72c to accommodate an eyelet 76 serving to provide an aperture 78 equivalent to aperture 18 in holder 10 of FIG. 1. The portion of body 72 below eyelet 76 is provided by two diverging wire segments 72d which serve to define a V-shaped slot 80. The divergent ends of wire segments 72d are integrally joined by an annular wire segment 72e which serves to define an aperture 82 equivalent to aperture 24 in the embodiment of FIG. 1. This annular segment 72e is preferably bent up out of the plane occupied by the intermediate portion of body 72 for the reasons expressed in connection with the bent-up body portion 12a of the embodiment of FIG. 1. Preferably, the body 72 is formed from a single piece of wire with its opposed ends meeting at one of the bowed out segments 72c as indicated at 72f, where crimping of the eyelet can serve to hold these wire ends in place. It will be understood the rope holder 70 is utilized in the same manner as was described in connection with the embodiment of FIG. 1.

Figure 8:
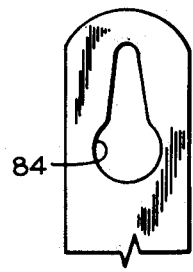
FIG. 8 is a fragmentary plan view of an alternative form of anchoring means which can be utilized in lieu of the hook seen in the embodiments of FIGS. 1 and 4.

FIG. 8 illustrates an alternative form of anchoring means rather than the hook seen in the embodiments of FIGS. 1 and 4. Specifically, the upper portion of the holder body may be provided with a keyway opening 84 for accepting and holding the knotted end of a rope (not shown). In fact, this rope may be the same rope running through the holder, such that the rope is essentially tied on itself for application around packages and the like in the manner disclosed in the above-noted U.S. Pat. No. 760,428.

As illustrated in FIG. 2, the portion of body 12 bounding aperture 18 may be provided with a slot illustrated in phantom at 85, through which the rope may be passed for entry into aperture 18. This would obviate the need to thread the free end of the rope through this aperture, thus facilitate the initial application of rope holder 10 to rope 20.

Figure 9:
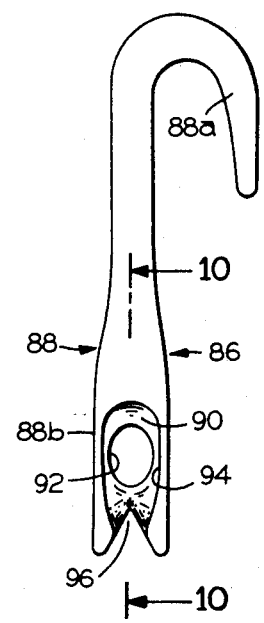
FIG. 9 is a plan view of yet another rope holder embodiment of the present invention.
Figure 11:
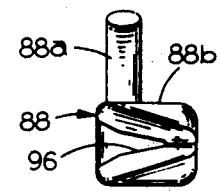
FIG. 11 is an end view of the rope holder embodiment of FIG. 9.
Figure 10:
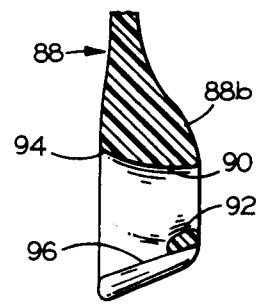
FIG. 10 is a sectional view taken along line 10—10 of FIG. 9.

The rope holder embodiment of FIGS. 9 through 11, generally indicated at 86, is configured for molding in plastic. Its body, generally indicated at 88, is formed with a laterally extending hook 88a, (for molding convenience) at one end and a thickened or bulbous portion 88b at its other end. A transverse, conical passageway 90 is formed in bulbous body portion 88b to provide at its small end a first aperture 92 and at its large end a second aperture 94, equivalent to aperture 18 and 24, respectively, of rope holder 10 of FIG. 1. A V-shaped slot 96 is formed in the sidewall of passageway 90 with its wide end in open communication with aperture 94. The free end of a rope is threaded through this passageway from the end of the rope, it is simply drawn from second aperture 94 into slot 96 where it is wedged to maintain the desired rope tension.

It will thus be seen that the objects set forth above and those made apparent in the preceding description are efficiently attained and, since certain changes may be made in the above constructions without departing from the scope of the invention, it is intended that all matter contained in the above description and shown in the accompanying drawings shall be interpreted as illustrative and not in a limiting sense.

Having described my invention, what I claim as new and desire to secure by Letters Patent is:

1. A holder for adjustably belaying the free end of a rope or the like, said holder comprising, in combination:
 A. an elongated body;
 B. a laterally extending hook integrally formed with said body adjacent one end thereof for anchoring the holder to a desired object;

C. means defining a first aperture in said body through which the free end of the rope is drawn;
D. means defining a second aperture in said body through which the rope free end extending from said first aperture is drawn, said first and second aperture defining means provided by a conical passageway formed in said body adjacent its other end and extending perpendicular to the longitudinal axis of said body, the opposite ends of said passageway constituting said first and second apertures, and
E. means forming a V-shaped slot in the sidewall of said conical passageway, said slot having its wide end in open communication with said second aperture and extending generally toward said first aperture,
  (1) whereby, the free end of the rope is pulled in a given direction to draw the rope through said first and second apertures and said passageway to a desired tension, and then deflected laterally from said given direction to move the rope out of said second aperture into said slot,
  (2) thereby wedging the rope in said slot to maintain the desired rope tension, which inherently pulls the rope deeper into said slot.

* * * * *